United States Patent [19]

Lang

[11] Patent Number: 5,995,554

[45] Date of Patent: Nov. 30, 1999

[54] DATA FRAMING FORMAT FOR DIGITAL RADIO COMMUNICATIONS AND METHOD OF FORMING SAME

[75] Inventor: Ralph Uwe Lang, Richmond, Canada

[73] Assignee: Vtech Communications, Ltd., The Hong Kong Special Administrative Region of the People's Republic of China

[21] Appl. No.: 08/656,720

[22] Filed: Jun. 3, 1996

[51] Int. Cl.⁶ .................................................. H04L 27/04
[52] U.S. Cl. ........................ 375/295; 370/470; 370/476
[58] Field of Search ................................... 375/295, 300; 370/470, 471, 472, 474, 476; 340/825.44

[56] References Cited

U.S. PATENT DOCUMENTS

| | | | |
|---|---|---|---|
| 3,838,395 | 9/1974 | Suttill, Jr. et al. | 340/149 A |
| 4,353,065 | 10/1982 | Mori | 340/825.44 |
| 4,479,125 | 10/1984 | Mori | 340/825.44 |
| 4,529,980 | 7/1985 | Liontine et al. | 340/825.52 |
| 4,649,543 | 3/1987 | Levine | 371/41 |
| 4,663,623 | 5/1987 | Lax et al. | 340/825.44 |
| 4,663,765 | 5/1987 | Sutphin et al. | 340/5 |
| 4,745,408 | 5/1988 | Nagata et al. | 340/825.44 |
| 4,783,654 | 11/1988 | Ichikawa | 340/825.44 |
| 5,050,165 | 9/1991 | Yoshioka et al. | 370/401 |
| 5,285,443 | 2/1994 | Patsiokas et al. | 370/29 |
| 5,297,203 | 3/1994 | Rose et al. | 380/9 |
| 5,504,773 | 4/1996 | Padovani et al. | 370/476 |
| 5,532,556 | 7/1996 | Anderson et al. | 370/470 |
| 5,592,487 | 1/1997 | Knecht et al. | 370/473 |

OTHER PUBLICATIONS

Common air interface specification (CTX–2) by European Telecommunications Standards Institute, Nov. 1994, Second Edition (I–ETS 300 131).

*Primary Examiner*—Temesghen Ghebretinsae
*Attorney, Agent, or Firm*—Dick & Harris

[57] ABSTRACT

A data frame format, and method for forming a data frame for use in a wireless communication system, which includes both voice and command/control data in each frame. The data frame has two or more voice fields and two or more command fields. Each of the voice fields are equal in size and contain an equal portion of the digital audio data. The voice fields may be further arranged into two or more sub-portions arranged most significant to least significant bit and each of the sub-portions are arranged most significant to least significant bit. The voice fields may further include a check field contiguous to one of the two or more sub-portions to provide the ability to determine whether a selected portion of each of the sub-portions is erroneous. Each of the command fields contain an equal portion of the digital command data. Each of the two or more command fields are interleaved between the two or more voice fields and contiguous to at least one of the two or more voice fields in the data frame. The data frame may also include a frame synchronization field.

6 Claims, 2 Drawing Sheets

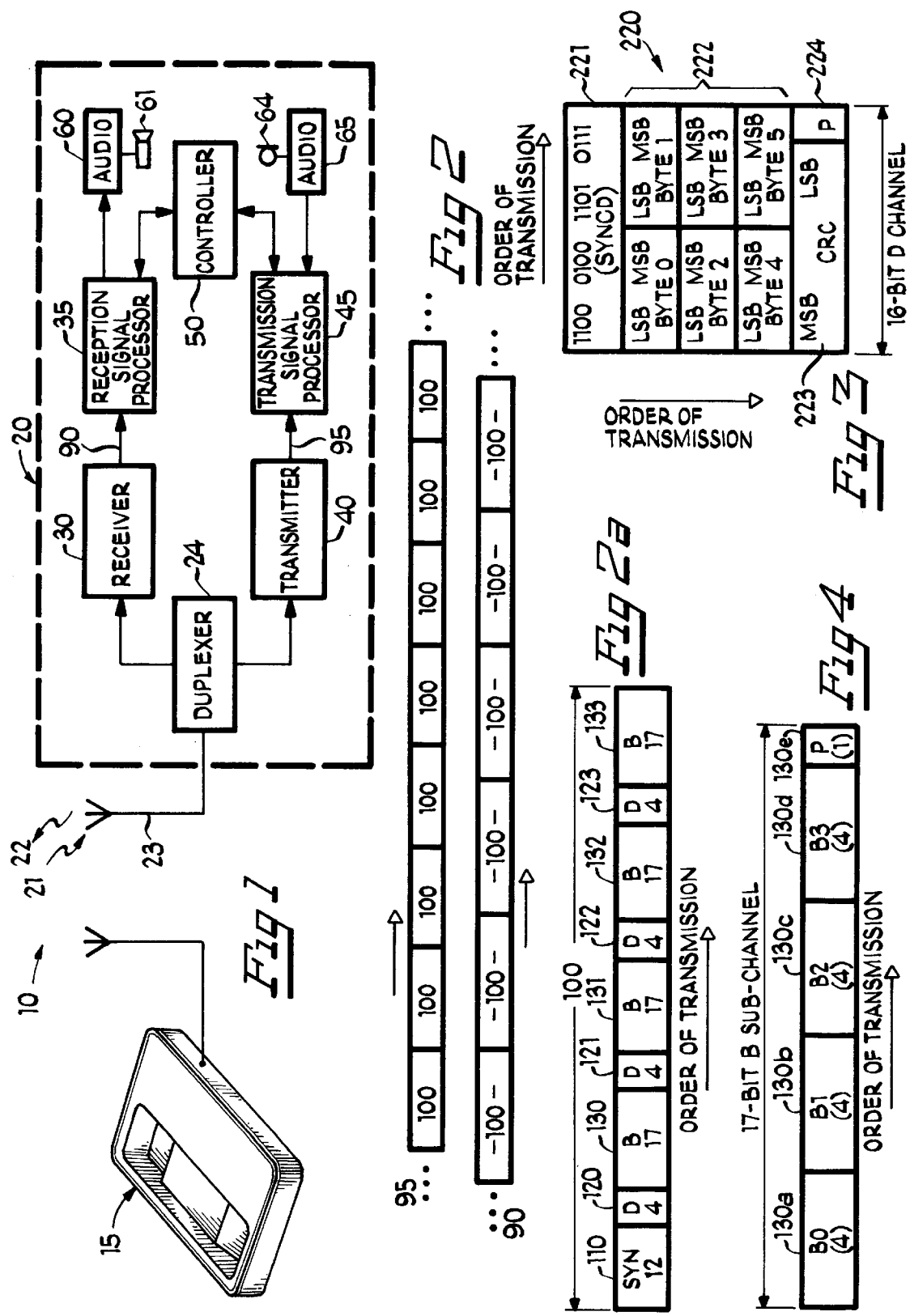

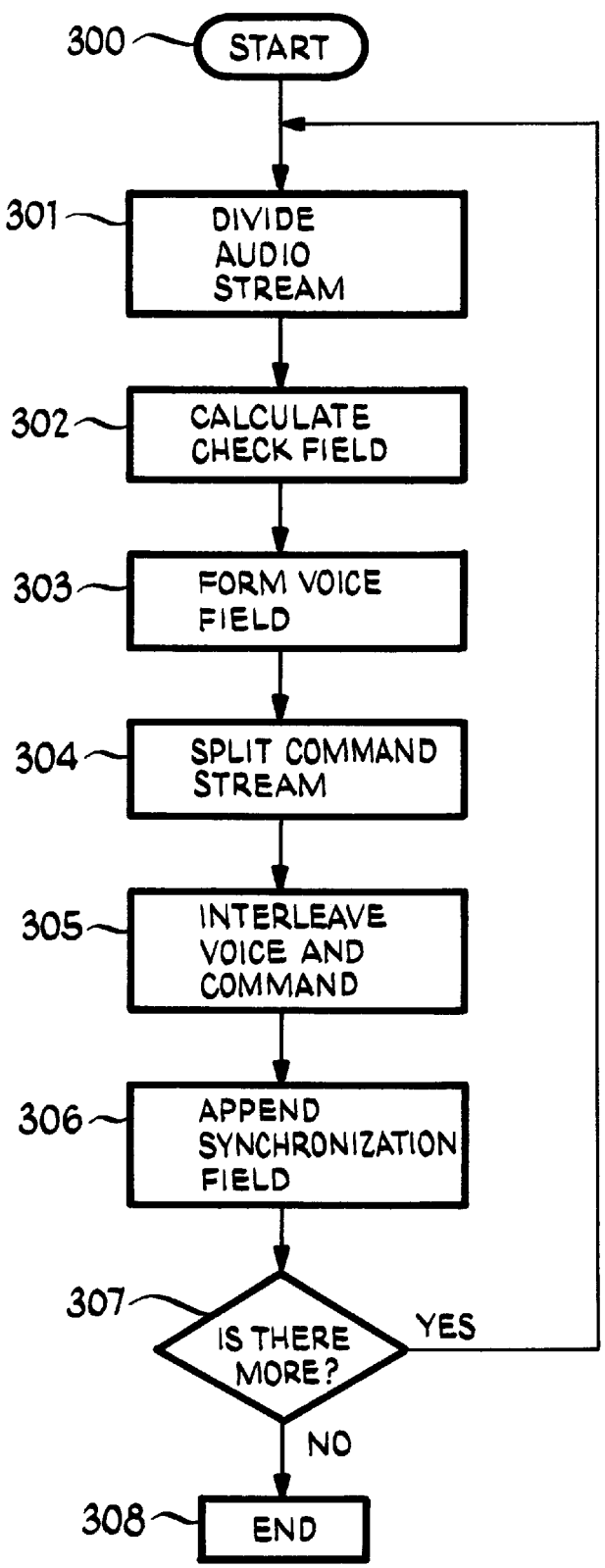

DATA FRAMING FORMAT FOR DIGITAL RADIO COMMUNICATIONS AND METHOD OF FORMING SAME

BACKGROUND OF THE INVENTION

1. Field of the Invention

The present invention relates in general to digital radio communications and, in particular, to a data framing format for transmitting a stream of digital data.

2. Background Art

The transmission of digital voice data over a radio frequency communication link is very often implemented by transferring the digital data as discrete packets or frames of information from a transmitter to a receiver, as opposed to transferring the data as a continuous homogenous stream of data. In some digital communication systems multiple types, or configurations, of data packets each having different characteristics, such as length and data type, are employed. In such a system one packet type may configured for voice, another for command, and yet another to acquire and maintain synchronization between the transmitter and receiver. A system incorporating multiple types of data packets may often experience control problems which typically increases system complexity, and which contribute to other undesirable design and operating characteristics.

Cordless telephone devices designed to the CT-2 specification are representative of a digital radio communication system incorporating multiple types of data packets. In the environment of a cordless telephone conforming to the CT-2 specification, a telephone conversation begins with initiation of the radio link. During the course of a conversation both audio data corresponding to the user's voice and command data corresponding to user pressed keys and background operation of the phone are transferred over the radio link. In such a system the ratio of audio data to command data is quite large. This large ratio results in a limited or diminished ability to control and monitor operation of the phone during an ongoing active conversation. The CT-2 specification adds further complexity by omitting the use of a synchronization field during active conversation which, in turn, necessitates further processing of the data stream in an attempt to maintain frame synchronization.

Accordingly, it is an object of the present invention to provide a single data frame type containing both audio and command data in every frame. It is a further object to include a separate synchronization field in each data frame to simplify synchronization of the data packets.

Other prior art digital communication systems are constructed utilizing data packets having segregated fields for synchronization, voice, command and error-correction in each frame. This approach creates an inherent delay in audio data transmission and processing directly related to the arrangement of these packets. In most of these systems, the segregation of the various types of data (i.e. voice, command, sync) requires extensive buffering to bundle the overall frame for transmission and, later, to unbundle the overall frame upon reception. As these systems become more complex—resulting in increased sub-field sizes—this delay will enviably increase.

Delay in digital communication is undesirable. Studies have shown that delay in a digital audio data path decreases the Mean Opinion Score (MOS)—which is an indication of users' subjective observation of the audio quality for the transmission system. Part of the decreased audio quality observed has been attributed to delay itself which when long enough to be noticeable may cause users to speak simultaneously or think that the other is slow in responding. Moreover, degradation of the audio quality has been further objectively attributed to the introduction of delayed echoes in the audio channel. Notwithstanding the nature of any such effect upon the audio quality of the communication system, audio channel delay is recognized as undesirable.

Accordingly, it is a further object of the present data frame to minimize delay in the audio channel of a digital communication system.

These and other objects of the present invention will become obvious to those of ordinary skill in the art based upon the attached specification, drawings and claims.

SUMMARY OF THE INVENTION

The present invention comprises a data frame for use in a radio system that continuously transmits both digital audio data and digital command data between stations in a radio system such as a cordless telephone system. In particular, the data frame has a beginning and an end, and specifically comprises at least two or more voice and two or more command fields, which are interleaved together. In a preferred embodiment, each of two or more voice fields are equal in size and contain an equal portion of digital audio data which, in certain embodiments, are arranged into two or more sub-portions. These two or more sub-portions are arranged most significant to least significant within each of the two or more voice fields and each of the two or more sub-portions being arranged most significant to least significant bit within each of the two or more sub-portions.

In a preferred embodiment, each one of the two or more voice fields includes, in addition to the audio data, a check field calculated from the associated audio data. Ideally, this check field is contiguous to the voice field and in the preferred embodiment is contiguous to each one of the two or more sub-portions of the each one of the two or more voice fields. This check field provides the ability to determine—depending upon the specific embodiment—whether a selected portion (or the whole) of the two or more voice fields is erroneous.

In a preferred embodiment, the two or more command fields each contain an equal portion of digital command data. A preferred embodiment further includes a frame synchronization field which is located at the beginning or end of the data frame and is contiguous to either one of the two or more voice fields and the two or more command fields.

The present invention further comprises a method for forming a data frame for use in a radio system that continuously transmits both digital audio data and digital command data between stations in a radio system, such as a cordless telephone system. In a preferred embodiment, the method comprises dividing the stream of the digital audio data into two or more audio fields, determining a check field value for each of the two or more audio fields and forming from the two or more audio fields and the check field value a two or more voice fields. Additionally, the stream of the digital command data is split into two or more command fields, which in one embodiment are of substantially shorter length than each of the two or more audio fields and the two or more voice fields are interleaved with the two or more command fields. Lastly, a synchronization field is appended thereto.

BRIEF DESCRIPTION OF THE DRAWINGS

FIG. 1 of the drawings is a block diagram of a radiotelephone in which the presently disclosed data framing format and method of forming same can be used;

FIGS. 2 and 2a of the drawings is a block diagram of the received and transmitted data streams and master frame of the present invention;

FIG. 3 of the drawings is a block diagram of the D-channel;

FIG. 4 of the drawings is a block diagram of the B-channel portion of the master frame; and FIG. 5 of the drawings is a flow chart of the method for forming the master frame of the present invention.

DETAILED DESCRIPTION OF THE DRAWINGS

While the present invention is susceptible of embodiment in many different forms and may be utilized in many different types of radiotelephonic systems, there is shown in the drawings and will herein be described in detail, one specific embodiment with the understanding that the present disclosure can be considered as an exemplification of the principles of the invention and is not intended to limit the invention to the embodiments illustrated. In particular, as in all digital communication systems, the data framing format disclosed is dependent to some extent on certain overall system design choices, such as the digital-to-analog conversion technique selected, the audio and command bit rates selected, and command complexity and transmission quality of the particular telecommunications environment. While the framing format is necessarily affected by these design choices, the inventive aspects of the presently disclosed data format are exclusive of these choices. As an exemplification of the principles of the present invention, some aspects of the framing format discussed herein have been selected to achieve a desired speech bit rate of 32 kbit/sec, transmission of an 80-bit command channel packet, and working within the system disclosed hereinbelow.

FIG. 1 of the drawings is a block diagram of one preferred digital radio communication environment for the presently disclosed data packet format. In particular, FIG. 1 shows a cordless telephone system 10 having base unit 15 and handset unit 20. While cordless telephone system 10 presents an appropriate environment within which the inventive data packet can be disclosed, other types of communication systems, including systems having multiple base units and/ or handset units are contemplated as environments, among others, in which the present invention has utility. Given that base unit 15 and handset unit 20 in most cordless telephone systems have substantially identical data processing paths, only handset unit 20 will described in detail with the understanding that much of the description applies equally to base unit 15 as readily understood by those skilled in the relevant art. Handset unit 20 receives and transmits digital signals 21 and 22, respectively, via antenna 23 and duplexer 24. Received digital signal 21 is recovered by receiver 30 in a manner which is independent of the inventive data format disclosed herein. Reception signal processor 35 operably accepts and processes received digital data stream 90 toward recovering voice and command data. The voice data is operably transmitted to audio recovery circuitry 60 and the command data is shown being operably transmitted to controller 50. Transmission signal processor 45 combines voice data from audio encoder 65 and command data from controller 50 to form transmitted digital data stream 95. Transmitted digital data stream 95 is transmitted by transmitter 40 in a manner which is likewise independent of the inventive data format disclosed herein.

As shown in FIGS. 2 and 2a, received and transmitted data streams 90 and 95 are each comprised of a plurality of master frames 100. As depicted in FIG. 2, these streams, and thus each of the individual bits of master frames 100, are transmitted from left to right. Accordingly, 12-bit synchronization field 110 is transmitted first, followed immediately by four 4-bit D-channel subframes 120, 121,122 and 123 and four 17-bit B-channel fields 130, 131, 132 and 133, interleaved therebetween. The specific sizes of each field in master frame 100 were selected due to particular overall system design choices, and more particularly the desired 32 kbit/s audio rate and preferred environmental system 10. Specifically, the chosen 96-bit length of master frame 100 can be transmitted by disclosed system 10 in approximately 2 milliseconds resulting in an overall bit rate of 48 kbit/sec. Inasmuch as each master frame has 68 B-channel bits a resulting B-channel transmission rate of 34 Kbit/s is achieved. As will be discussed more fully below, the 68 B-channel bits include 4 error-correction bits and 64 audio data bits. Accordingly, the effective audio data transfer rate for the selected field sizing is 32 kbits/sec equaling the desired bit rate for the selected environment. As can be seen from foregoing example, it is possible to design a master frame 100 sized for various bit rates (particularly those divisible by 2) and various transmission systems. However, any such design must necessarily take into account other design parameters, discussed hereinbelow, some of which constitute elements of the present invention.

Synchronization (SYNC) field 110 is a fixed synchronization pattern contained within each master frame 100. SYNC field 110 provides framing reference assisting the host telecommunication system to recover timing and frame alignment for the incoming transmitted digital data. Overall communication system design can be simplified by utilizing the same synchronization pattern in all stations for transmission and reception. In a preferred embodiment of master frame 100, SYNC field 110 contains 12 bits. This selected field length is a result of various trade-offs. First, the shorter the SYNC field 110 the more difficult it is to insure acquisition of the actual synchronization signal rather than a look-alike portion of data. Second, the longer the SYNC field 110, the greater the delay introduced in the audio channel. Although the effective delay could be partially minimized by splitting SYNC field 110 into multiple subfields spread across master frame 100, such an alternative increases the complexity of acquiring synchronization and introduces some of the concern of misidentification inherent in shorter synchronization fields.

Each master frame 100 further includes four 4-bit D-channel subframes 120, 121, 122 and 123, for a total of 16 command channel bits per master frame. D-channel subframes 120, 121, 122 and 123 each contain a portion of the control channel data, least significant bit first. For purposes of the present invention, the D-channel subfields must be as evenly interleaved between the B-channel subfields, as possible. With regard to the proportion of D-channel data in each master frame 100 and the length of each D-channel subfield, as with the design of SYNC field 110, the preferred embodiment disclosed represents the balancing of various trade-offs. First, given a fixed number of total bits per master frame per second, the larger the D-channel as a proportion of the total master frame 100, the slower the effective audio bit rate. Second, a larger D-channel sub-field will result in greater delay introduced into the audio data. Third, a smaller D-channel as a proportion of master frame 100, results in longer time required to complete a command transmission, in turn, consequently slowing the system response.

As shown in a preferred embodiment, four 4-bit D-channel subframes 120, 121, 122 and 123 are evenly interleaved between four 17-bit B-channel fields 130, 131, 132 and 133. Particularly, in systems designed to incorporate an error-controlled command channel having extensive features and/or a separate synchronization word, command channel packets tend to be lengthy and, thus, must be spread across more than one master frame 100 in order for a complete command to be transferred. A complete D-channel packet 220 (shown in FIG. 3) disclosed as an illustration of the present invention, contains 80-bits: a 16-bit D-channel synchronization field 221; a 6-byte (48 bits) command data field 222; a 15-bit cyclic redundancy check (CRC) field 223; and a parity bit 224. Even when there is no command data to be transmitted, D-channel data packet continues to be transmitted spread across the required number of consecutive master frames 100 though the actual data comprises an idle-D packet containing the D-channel synchronization word 221 with all remaining bits set to zero. This inclusion of an idle-D packet allows each master frame 100 to be identically sized and parsed, thus simplifying the transmission and recovery of data. In a preferred embodiment, the transmission and reception of an idle-D packet bypasses CRC generation and verification, respectively, thus minimizing needless high-overhead CRC processing.

Although not required for the practice of the present invention, the width of the command data (3 consecutive sets of 16 bits), led to the 16-bit wide synchronization word and 16-bit CRC code. In turn, it followed that allowing 16 D-channel bits per master frame 100 would provide the communication system the opportunity to acquire D-channel synchronization from one master frame 100.

As indicated, each master frame 100 contains four 17-bit B-channel subframes 130, 131, 132 and 133. Each of the four 17-bit B-channel fields are identical and accordingly only one such field will be described in detail. As illustrated in FIG. 4, 17-bit B-channel subframe 130, in a preferred embodiment, contains 4 ADPCM audio data nibbles (i.e. 4 bits) 130a, 130b, 130c and 130d. Channel check field 130e is the seventeenth bit of 17-bit B-channel fields 130. Accordingly, each master frame 100 contains 64 digital audio bits and 4 error-correction bits. Channel check field 130e is set by determining the even parity of the first two most significant bits of each ADPCM nibbles 130a, 130b, 130c and 130d. Among other advantages, the small length of each of the four 17-bit B-channel fields 130, 131, 132 and 133 facilitates earlier error detection than otherwise possible with one large audio field. In fact, the smaller the audio packet or field and the more frequent the check field, the earlier errors can be detected, but the lower the audio bit-rate. Accordingly, the field-size should be chosen to achieve a desired audio bit-rate; a selection that is dependent on overall transmission rate, command field size, and selected digital-to-analog conversion technique.

In the present invention, error-detection efficiencies are achieved by the division of the 17-bit B-channel fields into the still smaller nibbles and basing error-identification on only the first two most significant bits of each nibble. Initially, the size of the packet provides highly-close proximity between all bits in the field and easier access to each set of the most significant bits allowing the polling of fewer bits. As a result, the overhead associated with this error-identification is smaller and interspersed evenly within master frame 100, thus, spreading out error-detection throughout reception (or transmission) with a resulting minimization of detectable delay.

The method for forming the data frame is shown in FIG. 5. In particular, a stream of audio data is divided into B-channel subfields, which may be sized in relation to the fundamental sample size of the audio data (i.e. 4 ADPCM audio data per sample) (step 301). Each of these B-channel subfields are used to calculate an associated check field value (step 302). A plurality of B-channel subfields and each associated check field value are combined to form a voice field (step 303). Either before, during or after the audio stream division, a stream of command data is divided into D-channel subfields (step 304). In a preferred embodiment, these D-channel subfields are of substantially shorter length than each one of the overall voice fields. For instance, a preferred embodiment of data frame 100, has 16 bit voice subfields and a 4 bit command subfields. However, it is well within the scope of the present invention to divide the streams into more evenly sized fields. The voice and command subfields are evenly interleaved such that they alternate one to the next to form the majority of master frame 100 (step 305). In a preferred embodiment, a constant synchronization field is appended to one end or another of the frame of interleaved voice and command subfields (step 306). This continues until all of the voice and command data has been transmitted (steps 307 and 308).

One more aspect of the present invention counts the number of errors occurring within one or more master frames 100 and waits to act upon those errors until they exceed a predetermined number, thus minimizing the disruption in the audio channel. In one embodiment, this error counting is performed using an up/down counter. In this embodiment, the counter is reset for each master frame 100, however, this is a matter of design choice. However the error count is particularly calculated, once a predetermined threshold has been reached, disclosed system 10 "mutes" the audio signal to avoid processing the error containing data which would otherwise result in noise or static being heard by user and may otherwise effect some change in transmission characteristics based upon the system protocol in an attempt to improve signal quality.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A method of forming a data frame for use in a radio system that continuously transmits both digital audio data and digital command data between stations in the radio system via a plurality of said data frames, said data frame having a beginning and an end, said method comprising the steps of:

dividing a single stream of the digital audio data into two or more audio fields;

splitting a stream of the digital command data into two or more command fields;

interleaving the two or more audio fields with the two or more command fields evenly:

determining an associated check field value for each of the two or more audio fields; and appending to each of the two or more audio fields the associated check field.

2. A method of forming a data frame for use in a radio system that continuously transmits both digital audio data and digital command data between stations in the radio system, said data frame having a beginning and an end, said method comprising the steps of:

dividing a single stream of the digital audio data into two or more audio fields determining a check field value for each of the two or more audio fields forming two or more voice fields from the two or more audio fields and the check field value;

splitting a stream of the digital command data into two or more command fields of substantially shorter length than each of the two or more audio fields;

interleaving the two or more voice fields with the two or more command fields evenly; and appending a synchronization field that is shorter length than each of the two or more voice fields.

3. A method of forming a data frame for use in a radio system that continuously transmits both digital audio data and digital command data between stations in the radio system via a plurality of said data frames, said data frame having a beginning and an end, said method comprising the steps of:

dividing a single stream of the digital audio data into two or more audio fields;

arranging each of said two or more audio fields into two or more sub-portions placed most significant to least significant within each of the two or more audio fields;

splitting a stream of the digital command data into two or more command fields;

interleaving the two or more audio fields with the two or more command fields evenly.

4. The method according to claim 3 wherein the step of arranging further includes the sub-step of ordering the bits within each of the two or more sub-portions most significant to least significant.

5. A method of forming a data frame for use in a radio system that continuously transmits both digital audio data and digital command data between stations in the radio system via a plurality of said data frames, said data frame having a beginning and an end, said method comprising the steps of:

dividing a single stream of the digital audio data into two or more audio fields;

arranging each of said two or more audio fields into two or more sub-portions in which the bits within each subportion are ordered most significant to least significant;

splitting a stream of the digital command data into two or more command fields;

interleaving the two or more audio fields with the two or more command fields evenly.

6. A method of forming a data frame for use in a radio system that continuously transmits both digital audio data and digital command data between stations in the radio system via a plurality of said data frames, said data frame having a beginning and an end, said method comprising the steps of:

creating a single continuous stream of digital audio data by inserting zeroes into the stream of digital audio data where no data is available;

dividing the single stream of digital audio data into two or more audio fields;

splitting a stream of the digital command data into two or more command fields;

interleaving the two or more audio fields with the two or more command fields evenly.

* * * * *